(12) United States Patent
Irving

(10) Patent No.: US 7,574,764 B1
(45) Date of Patent: Aug. 18, 2009

(54) BOAT TRAILER HITCH RAMP ASSEMBLY

(76) Inventor: Don Irving, 1466 Edgar Ct., Plainfield, IN (US) 46237

( * ) Notice: Subject to any disclaimer, the term of this patent is extended or adjusted under 35 U.S.C. 154(b) by 351 days.

(21) Appl. No.: 11/583,763

(22) Filed: Oct. 19, 2006

(51) Int. Cl.
*E01D 1/00* (2006.01)
*E01D 15/00* (2006.01)
*E01D 15/12* (2006.01)

(52) U.S. Cl. .......................... 14/69.5; 296/61; 414/537
(58) Field of Classification Search .................. 14/69.5; 414/537
See application file for complete search history.

(56) References Cited

U.S. PATENT DOCUMENTS

| | | | |
|---|---|---|---|
| 5,649,732 A | 7/1997 | Jordan et al. | |
| 5,799,962 A * | 9/1998 | Barnhart | 280/166 |
| 6,076,215 A | 6/2000 | Blankenship et al. | |
| 6,286,734 B1 * | 9/2001 | Schneider | 223/93 |
| 6,296,290 B1 | 10/2001 | Wolf | |
| 6,371,719 B1 * | 4/2002 | Hildebrandt | 414/537 |
| 6,379,101 B1 | 4/2002 | Breaux | |
| 6,502,730 B2 * | 1/2003 | Johnson | 224/519 |
| 6,513,690 B1 * | 2/2003 | Churchill et al. | 224/498 |
| 6,533,337 B1 * | 3/2003 | Harshman et al. | 296/26.08 |
| 6,536,822 B1 | 3/2003 | Vagedes et al. | |
| 6,695,565 B1 | 2/2004 | Franchuk | |
| 6,712,248 B2 * | 3/2004 | Mitchell | 224/499 |
| 6,769,583 B1 | 8/2004 | Gordon et al. | |
| 7,070,220 B1 | 7/2006 | Lantaigne | |
| 2003/0090083 A1 * | 5/2003 | Williams | 280/460.1 |
| 2003/0189312 A1 * | 10/2003 | McNamee | 280/414.1 |
| 2008/0030004 A1 * | 2/2008 | Rempel | 280/656 |

OTHER PUBLICATIONS

Johnson, Johnson's Custom Mobility Carriers, commercial advertisement flyer, date unknown, Johnson, U.S.

* cited by examiner

*Primary Examiner*—Raymond W Addie

(57) ABSTRACT

A trailer hitch ramp assembly has a first ramp member secured to the trailer hitch and a second ramp member pivotally secured to the first. The second ramp member is foldable onto the first member to define a traveling position. When unfolded, the second ramp member can be positioned in an incline attitude along a side of the vehicle providing a ramp bridging the ground surface and the boat trailer so that a boater does not have to wade through water when launching a boat from a trailer. The ramp assembly includes a detachable wheel at the end of the second ramp assembly and a platform mounted to the boat trailer effective for supporting a human.

14 Claims, 4 Drawing Sheets

BOAT TRAILER HITCH RAMP ASSEMBLY

TECHNICAL FIELD OF THE INVENTION

This invention relates generally to boat trailers and hitches and, more particularly, to a trailer hitch ramp assembly useful for bridging the ground surface and the boat trailer.

BACKGROUND OF THE INVENTION

Boating enthusiasts typically must wade through the water when launching their boats from a trailer. The trailer and boat are usually towed behind a truck or other vehicle. During the launch, the trailer and boat are maneuvered down a ramp or incline and into the water. The water depth may depend upon many factors such as the amount of incline of the ramp, the rainfall for that season, and so on. To launch the boat successfully, however, the boater must submerge the trailer and boat in a sufficient depth of water so that the boat becomes buoyant and floats free of the trailer. The boat is then decoupled from the front of the trailer and hitched to the shoreline or dock, and the vehicle and trailer parked.

Intuitively, the boat, trailer, hitch and rear tires of the vehicle often must breach the water's edge to reach the depth necessary for successfully launching the boat. When this occurs, or in the event that the boater must access his boat for any reason, the boater must walk (or wade) through the water to reach the trailer and release the boat. This presents a problem when, for whatever reason, the boater does not wish to become wet. Hence, there therefore remains a need for a trailer hitch ramp assembly, which device will bridge the ground surface and the boat trailer. The present invention is directed toward meeting this need.

SUMMARY OF THE INVENTION

The present invention relates to a trailer hitch ramp assembly that includes a first ramp member effective for providing an above-ground walking surface between a vehicle and a trailer and a second ramp member for providing a walking surface that bridges the ground surface and the first ramp member. In one aspect of the invention, the second ramp member and the first ramp member are secured together by a pivot.

In another aspect, the second ramp member includes a hinge for folding the second ramp member.

In yet another aspect of the invention, the second ramp member includes at least one detachable wheel for supporting the second ramp member above the ground surface.

In still another aspect of the invention, there is a platform mounted to the boat trailer that is effective for supporting a human.

In yet another aspect of the invention, the ramp assembly includes means for securing together the first and second ramp members. In that aspect of the invention, the securing means is effective for permitting the second ramp member to move relative to the first ramp member along a first axis and a second axis.

One object of the present invention is to provide an improved trailer hitch ramp assembly, which assembly will bridge the ground surface and the boat trailer. Related objects and advantages of the present invention will be apparent from the following description.

DESCRIPTION OF THE PREFERRED EMBODIMENT

Figure 1:
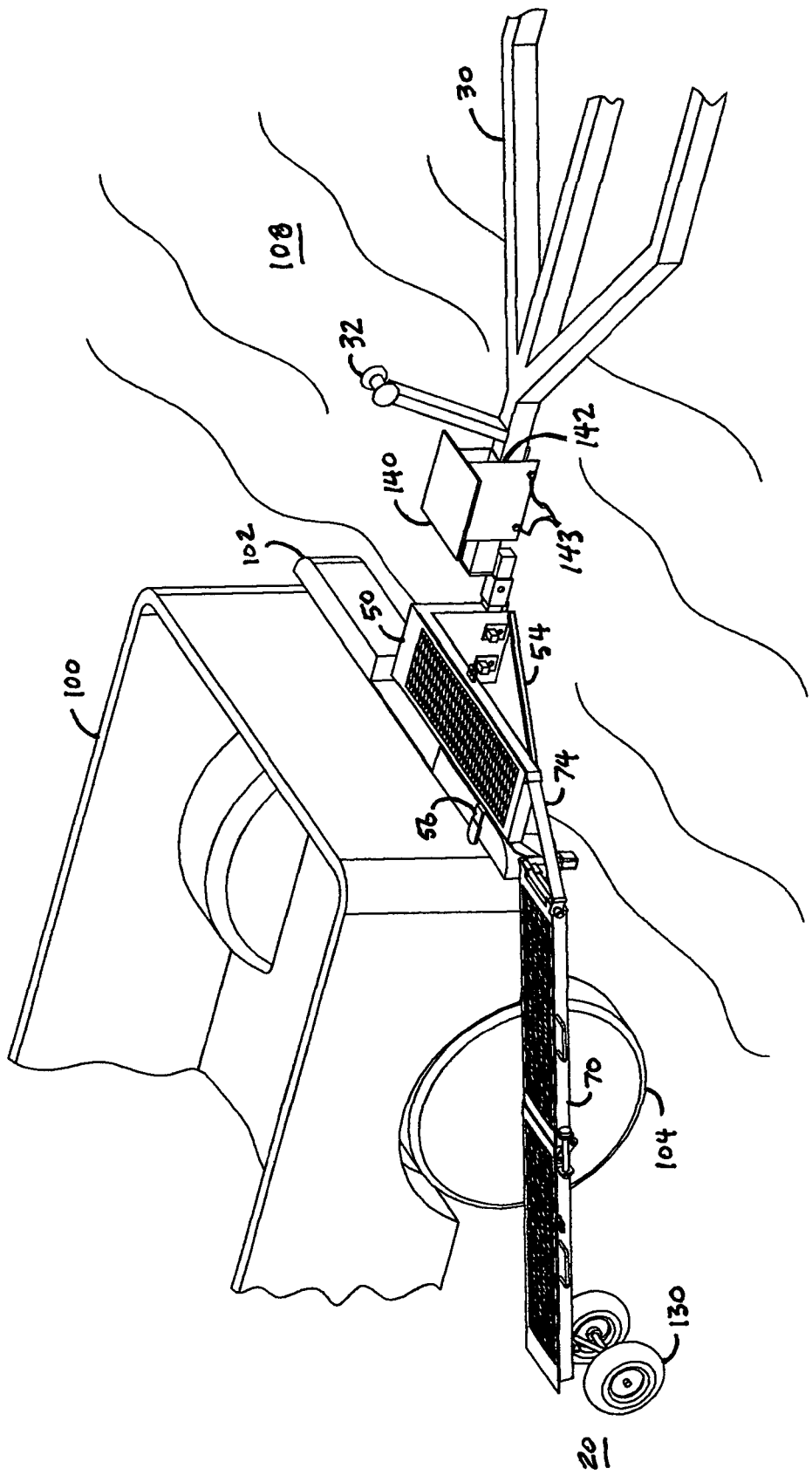
FIG. 1 is a perspective view of an embodiment of the present invention showing the first and second ramp members attached to a truck and the platform attached to a boat trailer.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Figure 2:
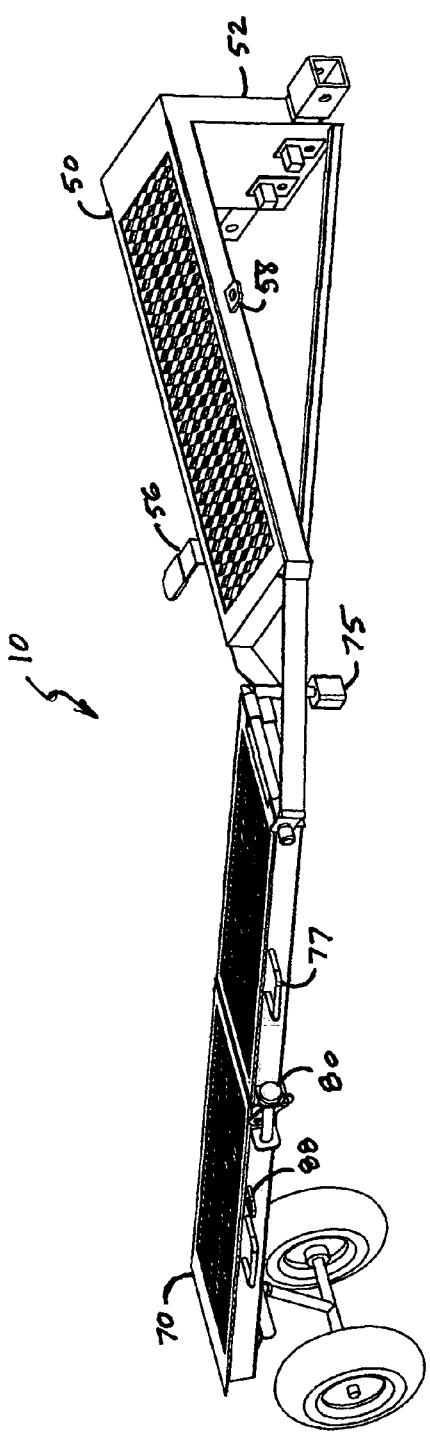
FIG. 2 is an elevated perspective view of an embodiment of the present invention shown in the extended position.
Figure 4:
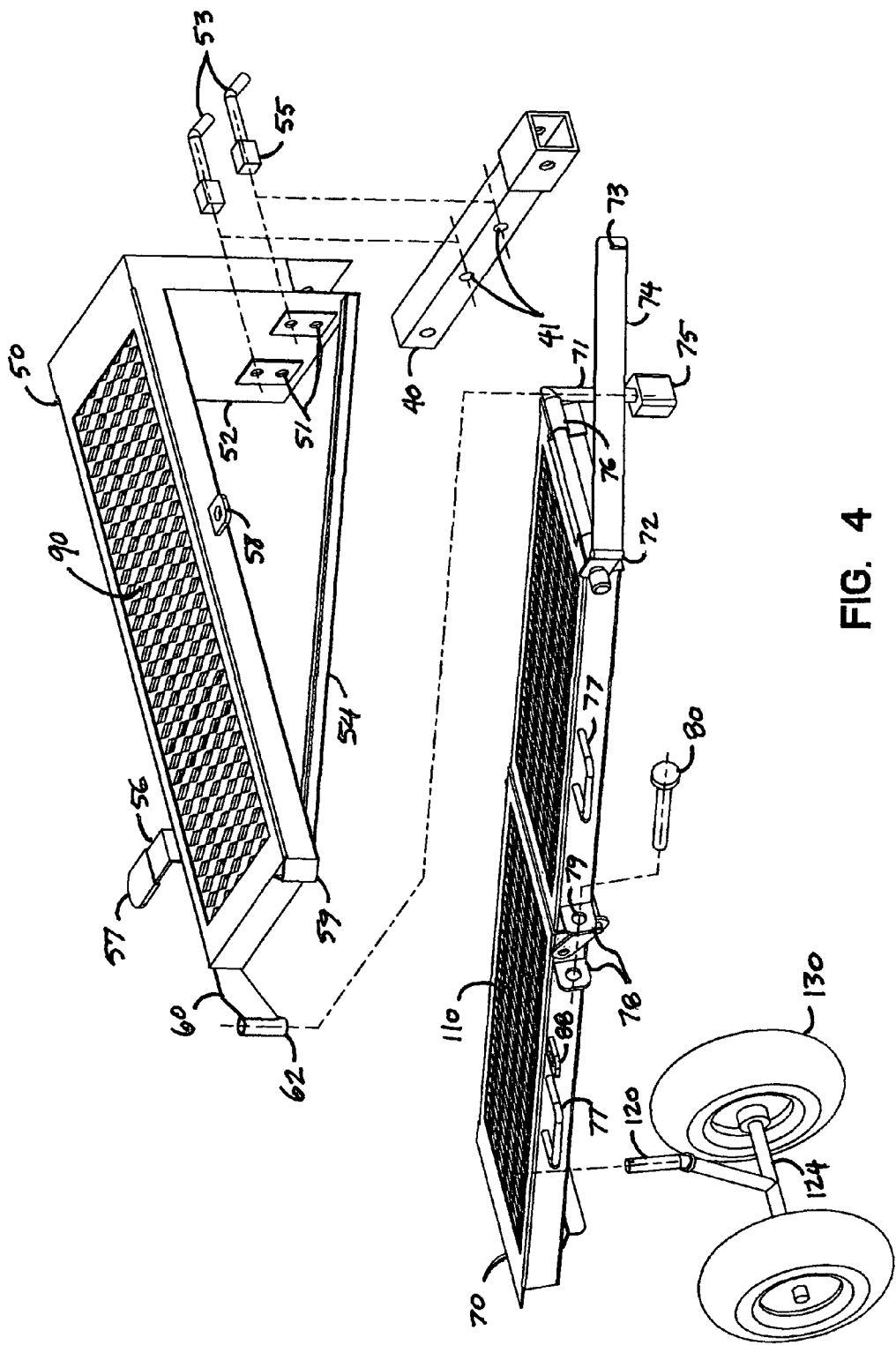
FIG. 4 is an elevational perspective view of an embodiment of the present invention shown disassembled.

With reference to the figures, the trailer hitch ramp assembly 10 includes a first ramp member 50 mounted between the vehicle 100 and boat trailer 30 and a second ramp member 70 for providing a walking surface that bridges the ground surface and the first ramp member 50, as shown in FIGS. 1 and 2. With reference to FIGS. 1 and 4, the first ramp member 50 includes a downwardly extending boss 52 with bores 51 formed in the boss for attaching to the hitch extension 40, a support arm 54, a support tab 56 with a pad 57 for resting on the bumper 102, a locking tab 58, non-skid surface 90, a protruding portion 59 and a pivot arm 60 with a cylinder 62 formed at its distal end.

In an embodiment of the invention, the female portion of a standard trailer hitch, which is secured to the vehicle 100, receives the hitch extension 40. Bores 51 and 41 are aligned to receive the pins 53, which secure boss 52 to the vehicle. In the preferred embodiment, there is more than one set of bores 51 to adjust the height of the first ramp member 50 relative to the vehicle bumper 102. Key locks 55 on the ends of pins 53 secure the pins in place. In the most preferred embodiment, the first ramp member 50 is attached in a manner so that it is level, and so that the first ramp member 50 extends a distance from the trailer hitch to a side of the vehicle 100.

Figure 5:
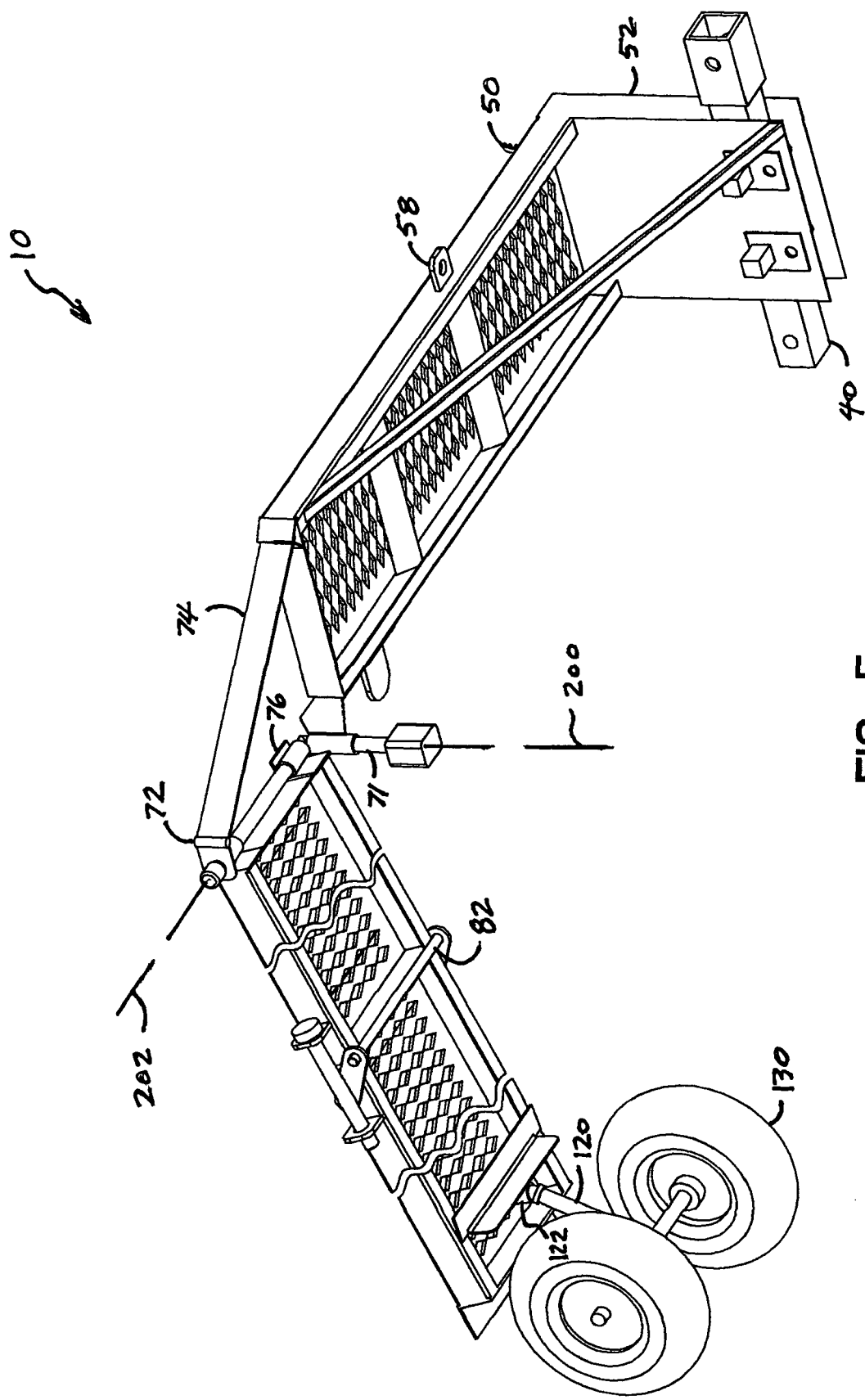
FIG. 5 is an elevational perspective view showing the underneath of an embodiment of the present invention.

Referring to FIGS. 4 and 5, the second ramp member 70 includes a movable attachment arm 74 with a hinge 72 at one end and a cutout 73 at its other end. In the preferred embodiment, pivot 71 with a lock 75 joins the second ramp member 70 to the first 50 so that the second ramp member can pivot relative to the first ramp member on axis 200. In that embodiment, the second ramp member 70 includes a hinge 76, which permits the second ramp member to move relative to the first ramp member 50 on axis 202.

Figure 3:
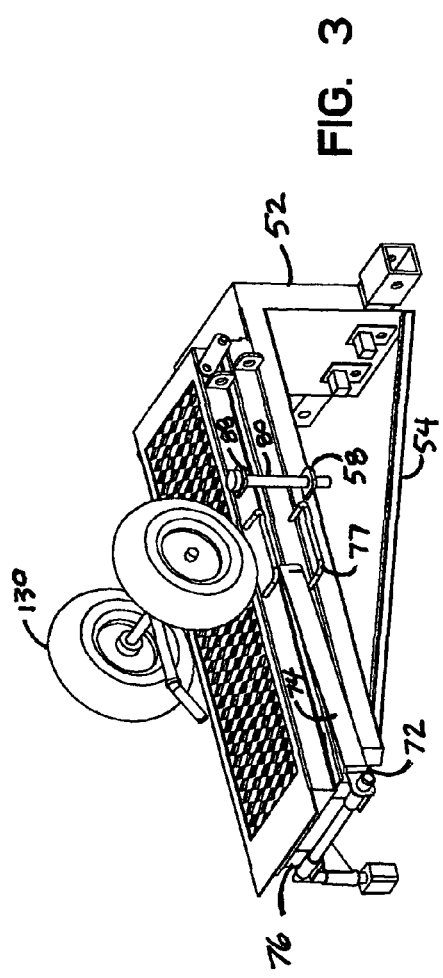
FIG. 3 is an elevated perspective view of an embodiment of the present invention shown in the stowed position.

In the preferred embodiment, the second ramp member includes hinge 82 located at its middle and effective for folding the second ramp member. In that embodiment, locking tab 88 and handles 77 are provided for lifting, folding and securing the second ramp member into the traveling position, as shown in FIG. 3. Second ramp member includes tabs 78 with bores 79 formed therein and a pin 80 effective for securing hinge 82 in the extended position, as shown in FIGS. 1 and 2. In the preferred embodiment, except where theft is a concern, such as the boss 52 coupling to the vehicle 100 and the pivot 71 joining the first and second ramp members, for example, the pins are secured in their corresponding bores by cotter pins (not shown).

Referring to FIGS. 4 and 5, at least one detachable wheel 130 is removably mounted at the end of the second ramp member 70 for supporting the second ramp member above the ground surface 20. In the preferred embodiment, the wheel 130 includes a pair of wheels connected for rotation by an axle 124. In that embodiment, a receiver 122 formed on the under surface of the second ramp member 70 receives a shaft 120 joined to the wheel 130 so that the shaft and thus, the wheel is free to rotate 360 degrees (360°).

In an embodiment, the ramp assembly 10 includes a platform 140 mounted to the boat trailer 30 effective for supporting a human. In the preferred embodiment, the platform includes a downwardly extending support 142, and the platform 140 may be mounted to the trailer 30 with bolts 143.

In a preferred embodiment, the first and second ramp members 50, 70 and the platform 140 are formed from aluminum. In a more preferred embodiment, the ramp members 50, 70 and the platform 140 include non-skid surfaces 90, 110, 145 and are formed from 20-24-gauge steel. In the most preferred embodiment, the ramp members 50, 70 and the platform 140 include non-skid surfaces 90, 110, 145 and are formed from a rigid material effective for supporting a human.

In the traveling position, as shown in FIG. 3, the second ramp member 70 is folded in half and made to rest in alignment upon the first ramp member 50. The bores in locking tabs 88, 58 receive pin 80 (with cotter pin) to hold the assembly in the collapsed traveling position. The wheel 130 shown atop the assembly in FIG. 3 is simply placed within the bed or trunk of the vehicle 100 during travel. In the preferred embodiment, a magnetic strip holds the attachment arm 74 against the side of the folded second ramp member 70 so that it does not move freely during travel.

Upon launching a boat, the operator removes pin 80 from locking tabs 58, 88, grasps handles 77 and unfolds the second ramp member 70. The second ramp member 70: (i) unfolds from itself at hinge 82; (ii) then unfolds from the first ramp member 50 at hinge 76 (movement relative to the first ramp member 50 on axis 202); and finally, (iii) pivots at a right angle relative to the first ramp member at pivot 71 (movement relative to the first ramp member 50 on axis 200) so that the second ramp member extends along the side of a vehicle, as shown in FIG. 1.

The first and second ramp members are joined together by the attachment arm 74. The cutout 73 in the attachment arm receives a sidewall of the protruding portion 59, and the bores 79 in tabs 78 receive the pin 80 and thus, the ramp members 50, 70 are secured together. The operator may then back the vehicle, boat and trailer into the water and launch the boat. Once the boat is in the desired position, the operator can step upon the end of the second ramp member 70 and walk upon the surface 110 to the first ramp member 50. The operator may then step onto the platform 140 where the trailer and boat rig are easily accessible. Since the assembly 10 and platform 140 are above ground, the operator avoids wading through the water 108. Once the boat is decoupled from the spindle 32, the operator may retrace his steps and return to the vehicle. The rotatable wheel 130 permits the ramp assembly 10 to stay in the extended position when the operator parks the vehicle and trailer. After loading a boat onto the trailer 30, the trailer hitch ramp assembly 10 may be returned to the folded traveling position (See FIG. 3) and the wheel 130 placed in the bed or trunk of the vehicle 100.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A ramp assembly attachable to a trailer hitch and useful for bridging the ground surface and a boat trailer, said assembly comprising:
   a first ramp member effective for providing an above ground walking surface between a vehicle and a trailer; and
   a second ramp member for providing a walking surface that bridges the ground surface and said first ramp member, the second ramp member is laterally pivotable relative to the first ramp member at a pivot to form a right angle with the first ramp member so that the second ramp member extends alongside of the vehicle, the second ramp member is foldable at a hinge onto itself, and the second ramp member is foldable at another hinge onto the first ramp member so the second ramp may be positioned in alignment on top of the first ramp member in a traveling position.

2. An assembly according to claim 1, wherein the second ramp member and the first ramp member are secured together by a pivot.

3. An assembly according to claim 1, wherein the second ramp member includes at least one detachable wheel for supporting said second ramp member above the ground surface.

4. An assembly according to claim 1, further comprising a platform mounted to the boat trailer effective for supporting a human.

5. An assembly according to claim 1, wherein the first ramp member further includes attaching means for removably attaching said first ramp to a trailer hitch, wherein said attaching is done in a manner so that said first ramp member is level, and so that the first ramp member extends a distance from said hitch to a side of a vehicle.

6. A trailer hitch ramp assembly useful for bridging the ground surface and a boat trailer, said assembly comprising:
   a platform mounted to a boat trailer effective for supporting a human;
   a first ramp member effective for providing a walking surface between a vehicle and a trailer; and
   a second ramp member for providing a walking surface that bridges the ground surface and said first ramp member, the second ramp member is laterally pivotable relative to the first ramp member at a pivot to form a right angle with the first ramp member so that the second ramp member extends alongside of the vehicle, an attachment arm depending from the second ramp member releasably secures the first and second ramp members together in the right angle.

7. An assembly according to claim 6, wherein the second ramp member and the first ramp member are secured together by a pivot to permit the second ramp member to move relative to the first ramp member along a vertical axis.

8. An assembly according to claim 6, wherein the second ramp member includes a hinge for folding said second ramp member.

9. An assembly according to claim 6, wherein the second ramp member includes at least one detachable wheel for supporting said second ramp member above the ground surface.

10. An assembly according to claim 6, wherein the first ramp member further includes attaching means for removably attaching said first ramp to a trailer hitch, wherein said attaching is done in a manner so that said first ramp member is level, and so that the first ramp member extends a distance from said hitch to a side of a vehicle.

11. A trailer hitch ramp assembly useful for bridging the ground surface and a boat trailer, said assembly comprising:
- a first ramp member effective for providing a walking surface between a vehicle and a trailer;
- a second ramp member for providing a walking surface that bridges the ground surface and said first ramp member; and
- a hinge and a pivot for securing together the first and second ramp members, said hinge and pivot being effective for permitting, respectively, said second ramp member to move relative to the first ramp member along a first horizontal axis so that the second ramp member may be unfolded from a traveling position, wherein the second ramp member is positioned in alignment on top of the first ramp member, and a second vertical axis so that the second ramp member may laterally pivot relative to the first ramp member to form a right angle with the first ramp member, the second ramp member extends alongside of the vehicle when said right angle is formed.

12. An assembly according to claim 11, wherein the second ramp member includes a hinge for folding said second ramp member.

13. An assembly according to claim 11, wherein the second ramp member includes at least one detachable wheel for supporting said second ramp member above the ground surface.

14. An assembly according to claim 11, wherein the first ramp member further includes attaching means for removably attaching said first ramp to a trailer hitch, wherein said attaching is done in a manner so that said first ramp member is level, and so that the first ramp member extends a distance from said hitch to a side of a vehicle.

\* \* \* \* \*